United States Patent
Chevallier et al.

(10) Patent No.: US 7,852,586 B2
(45) Date of Patent: Dec. 14, 2010

(54) DEVICE AND METHOD FOR SCANNING DATA STORED ON A RECORDING MEDIUM

(75) Inventors: Louis Chevallier, La Meziere (FR); Arnaud Morigault, Chateaubourg (FR); Lionel Oisel, La Nouaye (FR)

(73) Assignee: Thomson Licensing, Boulogne-Billlancourt (FR)

( * ) Notice: Subject to any disclaimer, the term of this patent is extended or adjusted under 35 U.S.C. 154(b) by 621 days.

(21) Appl. No.: 11/818,045

(22) Filed: Jun. 12, 2007

(65) Prior Publication Data

US 2008/0130425 A1 Jun. 5, 2008

(30) Foreign Application Priority Data

Jun. 30, 2006 (EP) .................................. 06300740

(51) Int. Cl.
*G11B 5/09* (2006.01)
(52) U.S. Cl. ........................... 360/53; 360/1; 360/77.06; 369/53.35
(58) Field of Classification Search ....................... None
See application file for complete search history.

(56) References Cited

U.S. PATENT DOCUMENTS 6,020,985 A 2/2000 McLeod et al.
6,525,897 B2 * 2/2003 Despain et al. .......... 360/77.06
7,142,488 B2 * 11/2006 Ukawa ..................... 369/44.32
2003/0063532 A1 4/2003 Yamada et al.

FOREIGN PATENT DOCUMENTS

WO WO96/41335 A2 12/1996

OTHER PUBLICATIONS

Search Report dated Nov. 29, 2006.

* cited by examiner

*Primary Examiner*—Jason C Olson
(74) *Attorney, Agent, or Firm*—Robert D. Shedd; Jeffrey M. Navon

(57) ABSTRACT

The invention concerns a method and a device for scanning data stored on a recording medium. The device comprises a reading head and further comprises:
   means to calculate an error rate of the data read by said reading head, said data being arranged as groups of data,
   means to align the reading head in respect with the next data to be read according to said error rate of the data read,
   the reading head reads at least twice some of said groups, changing position in respect with the group of data from one reading to the other,
   means to compare the calculated error rate corresponding to each position of the said reading head,
   means to align the reading head with the relative position in respect with the groups of data giving the lowest error rate in order to read the following groups of data, and
   the means to align the reading head adjust the frequency of the groups of data read at least twice.

5 Claims, 2 Drawing Sheets

DEVICE AND METHOD FOR SCANNING DATA STORED ON A RECORDING MEDIUM

This application claims the benefit, under 35 U.S.C. §119 of European Patent Application 06300740.5, filed Jun. 30, 2006.

FIELD OF THE INVENTION

The invention concerns a method and a device for scanning data stored on a recording medium.

BACKGROUND OF THE INVENTION

The invention concerns more particularly the recording of data on film or also on optical storage such as holographic memory.

The reading of data on such medium can be difficult as the "reading head", or what can be considered as reading head, is not properly aligned with the data to be read.

Particularly, using film for archiving digital data, and looking for high density storage, becomes a great challenge. Thus, the size of pixels used for recording the data on the film cannot be lower than a certain limit depending on:

the size of particles constituting the film, which vary from 0.2 to 1 micron,
characteristics of the equipment in charge of printing and reading the data on the film, and more particularly on their resolution and stability.

Moreover, the film ageing over the years can also alter the quality of data on the film, making the scanning of data more difficult.

When scanning the data, the scanner has to be aligned with the data. When data are analog data representing images for instance, the alignment is not crucial during the scanning as there is no need for decoding afterwards. However, when digital data are stored on the film, the scanning becomes crucial, in order to be able to recover the data and decode them. So, if the scanner is not aligned properly with the pixels, the data cannot be recovered properly despite the redundancy data and several pixels will be erroneous.

SUMMARY OF THE INVENTION

To this end, the invention proposes a device for scanning data stored on a recording medium comprising a reading head. According to the invention, the device comprises means to calculate an error rate of the data read by said reading head, said data being arranged as groups of data,
means to align the reading head in respect with the next data to be read according to said error rate of the data read,
the reading head reads at least twice some of said groups, changing position in respect with the group of data from one reading to the other, said device further comprises
means to compare the calculated error rate corresponding to each position of the said reading head,
means to align the reading head with the relative position in respect with the groups of data giving the lowest error rate in order to read the following groups of data and
the means to align the reading head adjust the frequency of the groups of data read at least twice.

Preferentially, the reading head reads at least twice a first group of data and reads only once some of the following groups of data, keeping for these following groups of data the relative position in respect of the groups of data giving the lowest error rate for the first group of data read until the error rate for these following groups of data is too high to be corrected by the error correction means.

In an advantageous manner, when the error rate for the following groups of data is too high to be corrected by the error correction means, the reading head reads the first group of these following groups of data for which the error rate is too high, at least twice, changing position of the reading head for each reading in respect with the data to be read.

Preferentially, said recording medium is a color or black and white film, said reading head is a CCD reading head, said means to compare the calculated error rate being a forward error correction circuit, said means to align the reading head being a piezo electric actuator.

According to another embodiment, the recording medium is an holographic memory.

The invention concerns also a method for scanning data stored on a recording medium comprising a reading step. According to the invention, the method comprises a step to calculate an error rate of the data read, said data being arranged as groups of data,
a step to align the reading head in respect with the data to be read according to said error rate of the data read,
the reading head reads at least twice some of said groups, changing position in respect with the group of data from one reading to the other, said method further comprises
a step to compare the calculated error rate corresponding to each position of the said reading head,
a step to align the reading head with the relative position in respect with the groups of data giving the lowest error rate in order to read the following groups of data, and
the frequency of the groups of data read at least twice is adjusted during the step of aligning the reading head.

BRIEF DESCRIPTION OF THE DRAWINGS

Other characteristics and advantages of the invention will appear through the description of a non-limiting embodiment of the invention, which will be illustrated, with the help of the enclosed drawings.

DETAILED DESCRIPTION OF PREFERRED EMBODIMENTS

Figure 1:
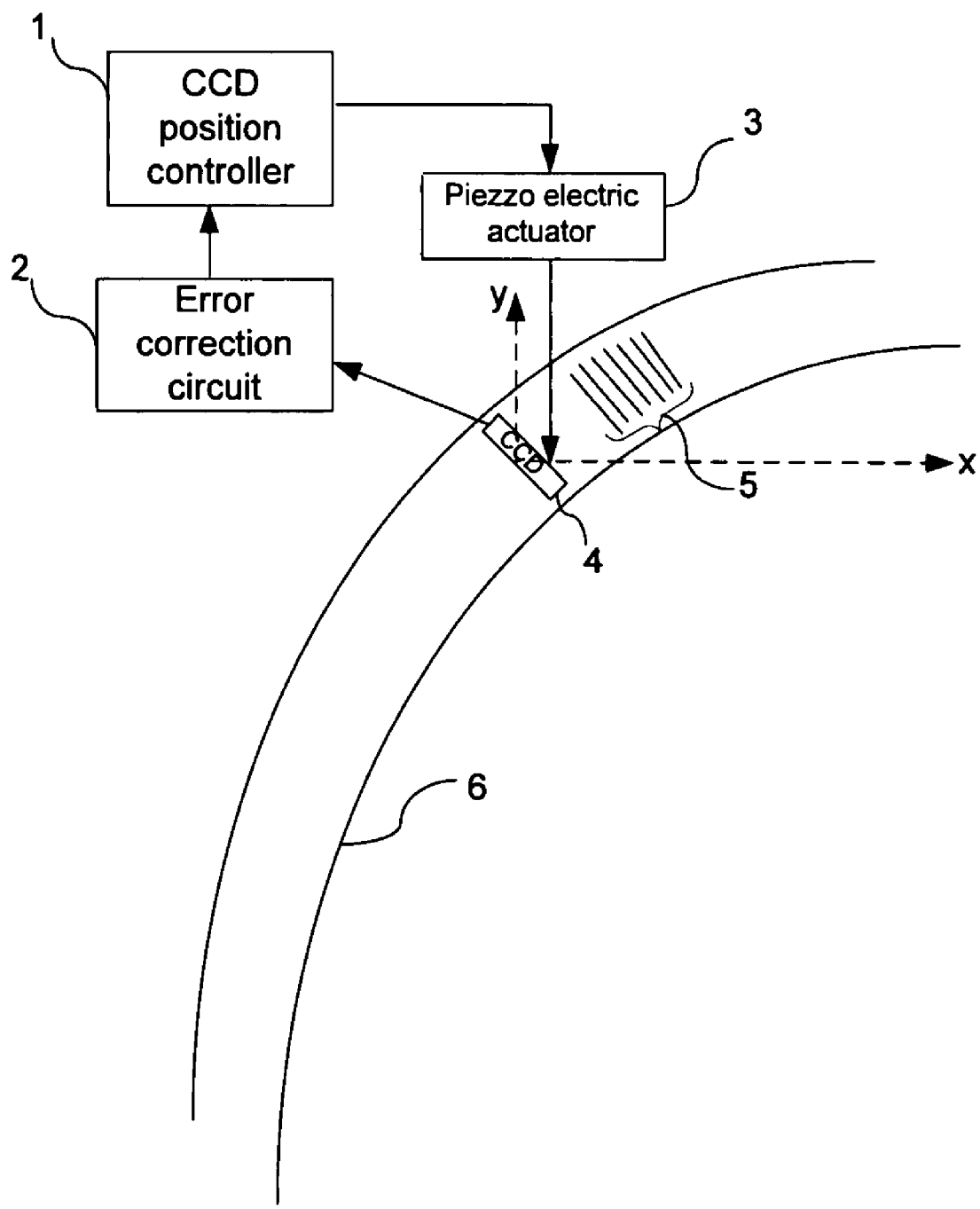
FIG. 1 represents a device according to an embodiment of the invention applied to the film.

Embodiments of the present invention may be implemented by any combination of various techniques combining software, firmware or hardware. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware component that contain hardwired logic for performing the steps, or by any combination of programmed computer components and custom hardware components.

Thus, a machine-readable medium may include any mechanism for storing or transmitting information in a form readable by a machine (for instance a computer). These mechanisms include, but are not limited to, floppy diskettes, optical disks, hard disk drives, holographic disks, compact disks read-only memory (CD-ROMs), magneto-optical disks, read-only memory (ROMs), random access memory (RAM), Erasable Programmable Read-only memory (EEPROM), magnetic or optical cards, flash memory, a transmission over the Internet, electrical, optical, acoustical or other forms of propagated signals (for instance carrier waves, infrared signals, digital signals, etc), or the like.

Unless specifically stated otherwise as apparent from the following discussion, it is appreciated that discussions utilizing terms such as "processing" or "computing" or "calculating" or "determining" or the like, may refer to the action and processes of a computer system, or similar electronic computing device, that manipulates and transforms data represented as physical quantities within the computer system memories or registers or other such information storage, transmission or display devices.

In the following detailed description of the embodiments, reference is made to the accompanying drawings that show, by way of illustration, specific embodiments in which the invention may be practices. In the drawings, numbers describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

The best embodiment of the invention described hereafter refers to film as storage medium but the invention is not limited to such king of recording medium and can also be applied to other types of storage, and for instance, the holographic memory.

The reading head used for reading films is generally a CCD (standing for charge coupled device) array but one could imagine other means to read such medium.

On FIG. 1 a system according to the invention is represented. Such a device is preferentially known as a scanner.

A film 6, standing here as recording medium, is printed containing data stored on the film and arranged in a series of lines. On this figure, a CCD reading head 4 is positioned on the film. The CCD reading head is positioned initially on the recording medium using (x,y) coordinates in a two-dimensions coordinates domain.

According to a piezo electric actuator 3, the CCD reading head can move in the two-dimensional coordinates domain.

An error correction circuit 2 is connected to the CCD reading head 4. This error correction circuit is of FEC (standing for "Forward Error Correction") type. Therefore, the data are organized as a sequence of useful data followed by their corresponding redundant data. The redundant data are used by the FEC circuit 2 in order to correct the redundant data in case the useful data are not properly read. Once the error correction circuit 2 has read the data, it corrects the data read in case of error.

The error rate calculated is sent to a CCD position controller 1. The CCD position controller 1 makes an analysis of the error rate received. It can store for each position of the CCD reading head 4, the associated error rate. According to the error rate received and for a number of predetermined times, it requests the piezo electric actuator 3 to move the CCD reading head 4 in the (x,y) axis. The movement is a very small movement in respect with the data to be read on the recording medium.

The CCD position controller 1 is equipped with memorizing means such as flash memory, in order to memorize the different positions of the CCD reading head 4 in the (x,y) axis and the associated error rate.

Once an adequate position has been found for a sequence of data read, the position is kept as "last good position" by the CCD position controller 1. This position is kept as initial position for the next sequence of data to be read. According to this embodiment a sequence of data is a line of data. An adequate position means that the error correction circuit can recover the data read by using the redundant data. This can of course happen in several positions. The adequate position is the position giving the lowest error rate. For this, the CCD position controller 1 orders a predetermined number N of movements to the piezo electric actuator 3. The last good position being the position among these N positions giving the lowest error rate.

This last good position can also be used for a number of following lines, without having to calculate several positions of the CCD reading head for each line of data. Keeping the last good position means keeping the last good position of the CCD reading head 4 in respect with the data to be read, therefore it means however that the reading head will move when reading a new line but the distance/position between the line of data and the CCD reading head will be the same as the one of the previous line. In such a case, if when reading the data of the following lines keeping this "last good position" as position in respect with the line of data to be read, the data cannot be corrected properly by the error correction circuit 2, a new position has to be found. In this case, the CCD position controller orders the piezo electric actuator 3 to move the CCD reading head 4 in order to find an adequate position giving a low error rate.

In other embodiments, the error correction circuit 2 can be of another type than FEC type.

Figure 2:
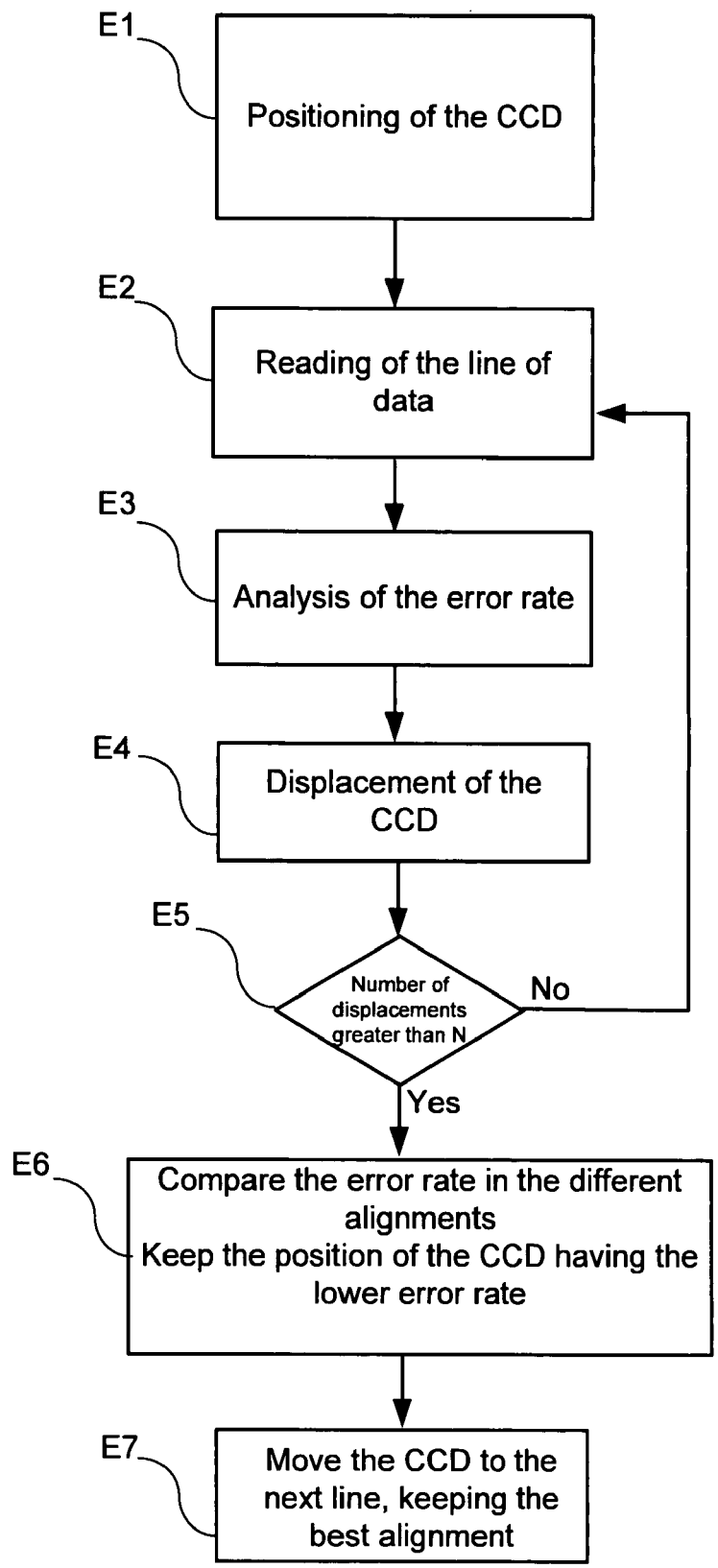
FIG. 2 represents an embodiment of a flow chart of the method according to the invention.

FIG. 2 represents a flow-chart representing the behavior of the CCD position controller 1 and the error correction circuit 2. Reference is made to the means described in reference to FIG. 1.

In a step E1, the CCD reading head 4 is positioned in a first position to read a first line of data on the recording medium 6. In order to get such a first position, the CCD reading head 4 is guided thanks to the environment. On typical scanner, the medium 6, such as paper or film, is guided with some scanner guiding means so that the CCD reading head 4 can start the reading at the same location on the recording medium 6 for each document.

However, no locking mechanism is used so that the CCD reading head 4 can move slightly around this first position in order to achieve the invention.

In a step E2, the reading of the line of data on the recording medium 6 is performed by the CCD reading head 4. The reading of the data consists in reading both the useful data and the redundant information associated with said useful information, both being stored sequentially or according to an arrangement known by the of the scanner.

In a step E3, the error correction circuit 2 of the scanner calculates an error rate of the data read during step E2. This error rate is calculated using the useful data and the associated redundant data. The algorithm used uses a forward error correction scheme (FEC). Therefore, in case of errors higher than a threshold, such a threshold being dependant on the parameters of the FEC algorithm, the line cannot be corrected totally.

In a step E4, the CCD reading head 4 moves slightly around its first position according to one dimension. According to the type of recording medium, the CCD reading head 4 can move in two dimensions. The coordinates of the CCD reading head 4 in each of the positions is memorized so that it can be recovered later during a step E6.

In a step E5, a comparison is made with N, a predetermined number and the number of displacements done by the CCD reading head 4. Such a number N can be adjusted according to the quality or type of the recording medium 6. Also it can be adjusted according to the error rate calculated, the higher the error rate is, the higher N has to be.

If the number of displacements is lower than N, then the line of data is read again during step E2 and steps E3 to E5 are repeated until the number of displacements is equal to N.

In a step E6, the error rate obtained for the N different positions of the CCD reading head 4 are compared. The position corresponding to the lowest error rate is kept as best alignment with the recording medium 6, this position having been memorized during step E4. N is at least equal to 2.

In a step E7, the CCD is moved to the next line of data to be read. The relative position of the CCD in respect of the line of data to be read is kept, said relative position being the best alignment obtained for the previous line. This means that the CCD reading head moves however, but its relative position with the line of data to be read is kept.

Steps E1 to E7 can be done for each line of data. However, in order to save time, and according to the error rate obtained, it can be considered to carry on steps E1 to E7 only for some of the lines, for instance for 1 line over 5. This can of course be modified during the reading. When steps E1 to E7 are not done for each line of data, the position used for these lines is the relative position kept for the last line for which steps E1 to E7 were performed. When the error rate is high, the method can be applied for each line. It is dependant on the error correction algorithm used, on the number of redundant data used for each line, a higher number of redundant data enabling to correct a higher number of errors. This is also dependant on the quality of the recording medium, and on the quality of the reading head;

According to another embodiment, the data can be stored alternating groups of data and of redundant data on the same line. This enables to use a less reliable recording medium, as more redundant information is used. In such a case, the data are also read line by line. Such an embodiment can be appropriate for recording medium which quality decreases considerably while aging.

What is claimed is:

1. A method for scanning data stored on a recording medium comprising a reading step characterized in that it comprises the following steps:
    calculating an error rate of the data read, said data being arranged as groups of data,
    aligning the reading head in respect with the data to be read according to said error rate of the data read,
    reading at least twice some of said groups,
    changing position in respect with the group of data from one reading to the other,
    comparing the calculated error rate corresponding to each position of the said reading head,
    aligning the reading head with a relative position in respect with the groups of data giving the lowest error rate in order to read the following groups of data
    wherein the method comprises the further step of
    determining how often the groups of data are read at least twice during the step of aligning the reading head, according to the error rate calculated.

2. Method according to claim 1 wherein the reading head reads at least twice a first group of data and reads only once some of the following groups of data, keeping for these following groups of data the relative position in respect of the groups of data giving the lowest error rate for the first group of data read until the error rate for these following groups of data is too high to be corrected.

3. Method according to claim 2 wherein when the error rate for the following groups of data is too high to be corrected by the error correction means, the reading head reads a first group of these following groups of data for which the error rate is too high, at least twice, changing position of the reading head for each reading in respect with the data to be read.

4. Method according to claim 1 wherein said recording medium is a color or black and white film, said reading head is a charge coupled device reading head, said means to compare the calculated error rate being a forward error correction circuit, said means to align the reading head being a piezo electric actuator.

5. Method according to claim 1 wherein said recording medium is an holographic memory.

* * * * *